W. G. PARKER.
FRUIT GRADER.
APPLICATION FILED NOV. 27, 1915.

1,189,167.

Patented June 27, 1916.
2 SHEETS—SHEET 1.

Inventor
Walter G. Parker
by his attorney

W. G. PARKER.
FRUIT GRADER.
APPLICATION FILED NOV. 27, 1915.

1,189,167.

Patented June 27, 1916.
2 SHEETS—SHEET 2.

Inventor
Walter G. Parker,
by his attorney,

UNITED STATES PATENT OFFICE.

WALTER G. PARKER, OF MILFORD, NEW HAMPSHIRE.

FRUIT-GRADER.

1,189,167. Specification of Letters Patent. Patented June 27, 1916.

Application filed November 27, 1915. Serial No. 63,873.

*To all whom it may concern:*

Be it known that I, WALTER G. PARKER, a citizen of the United States, residing at Milford, in the county of Hillsboro and State of New Hampshire, have invented new and useful Improvements in Fruit-Graders, of which the following is a specification.

This invention relates to improvements in apparatus for grading fruits.

The object of the invention is to provide a simple and durable apparatus adapted to facilitate the grading or sorting of fruit from a mass of fruit and depositing the same in suitable receptacles with the fruit in each receptacle, substantially of the same size, thus dispensing with the slow and tedious hand grading method and reducing to a minimum the danger of bruising the fruit so graded.

The invention consists in the combination and arrangement of parts set forth in the following specification and particularly pointed out in the claims.

Figures 1, 2:
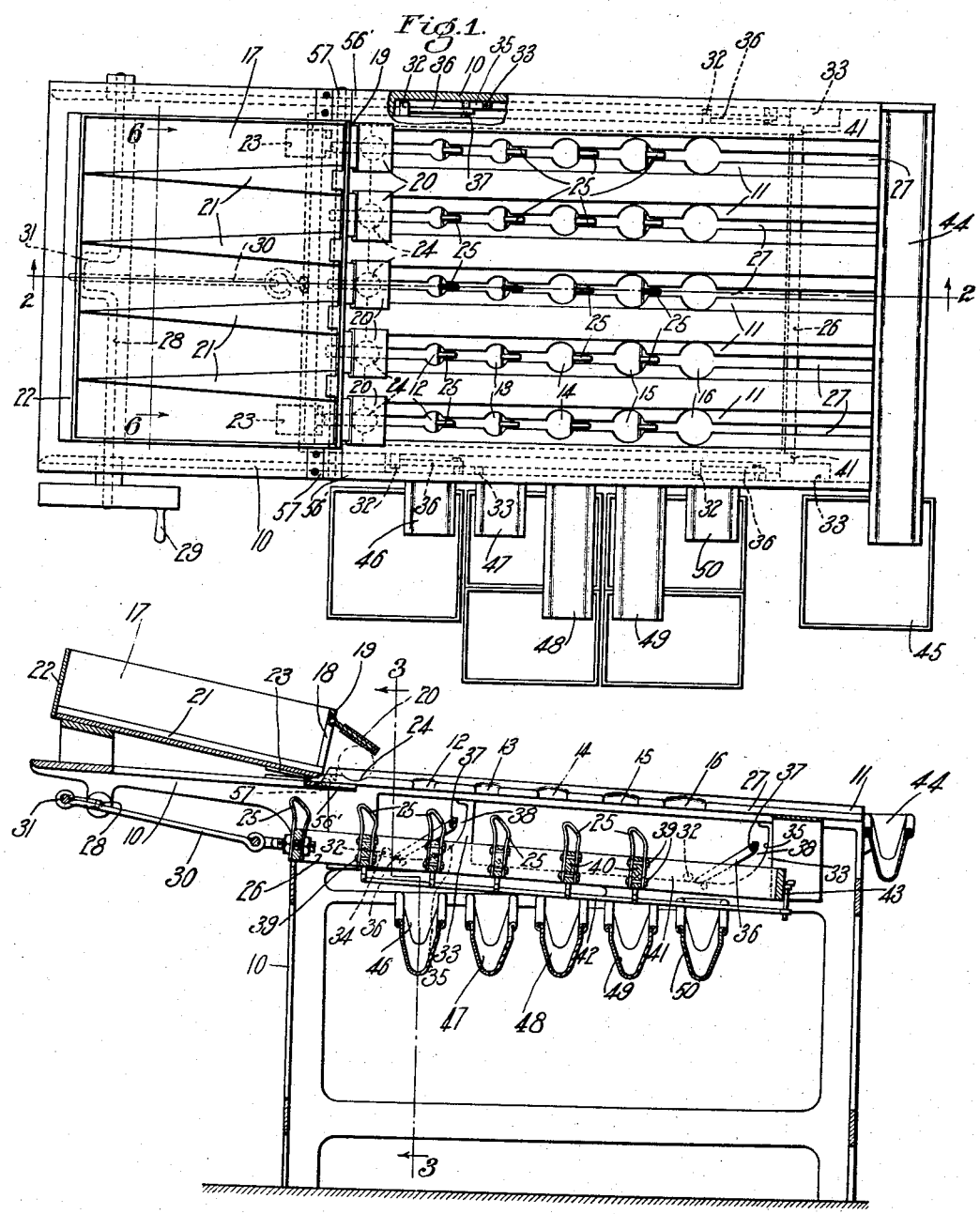
Figure 4:
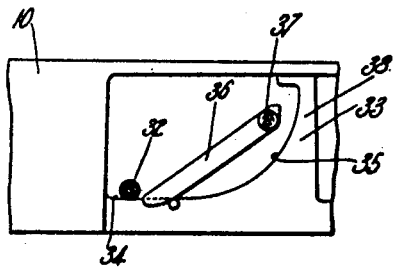
Figure 3:
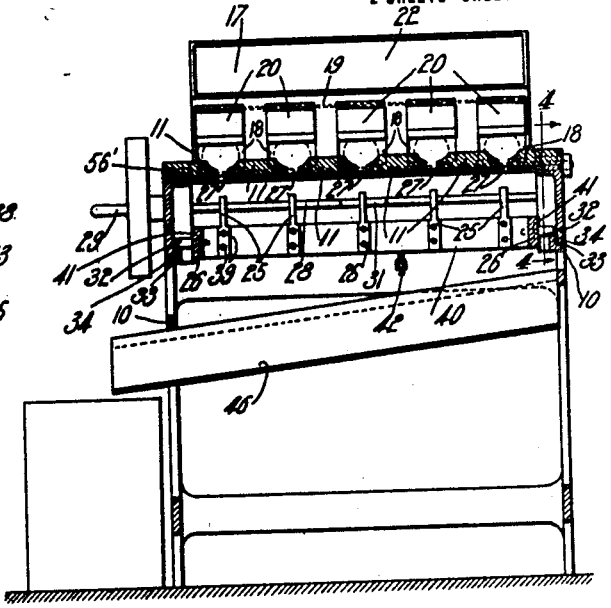
Figure 5:
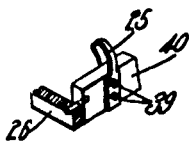
Figure 7:
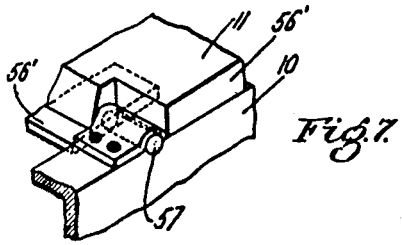
Figure 6:
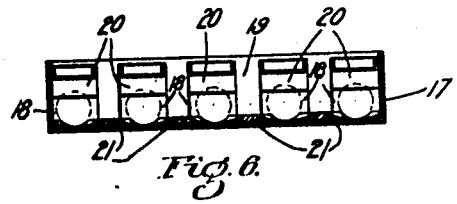
Figure 8:
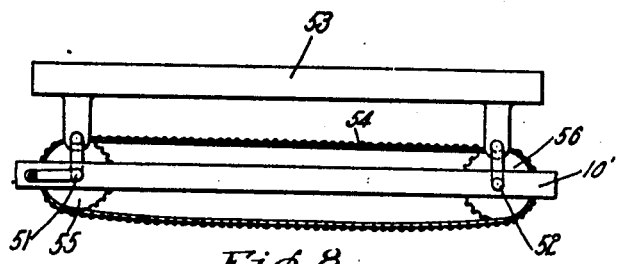

Referring to the drawings: Figure 1 is a plan view of an apparatus embodying my invention. Fig. 2 is a longitudinal section taken substantially on the line 2—2 of Fig. 1. Fig. 3 is a transverse section taken on the line 3—3 of Fig. 2. Fig. 4 is a detail elevation of one of the switches which operates automatically to produce the desired movement of said pushers in relation to the chutes. Fig. 5 is a detail perspective view of one of the pusher supporting bars with a pusher shown attached thereto. Fig. 6 is a transverse section taken on the line 6—6 of Fig. 1. Fig. 7 is a detail perspective view of one of the hinges for the chute supporting frame and Fig. 8 is a detail view of a modified form of means for effecting the desired movement of the pusher carrier frame.

Like numerals refer to like parts throughout the several views of the drawings.

In the drawings, 10 is a frame and 11, 11 are chutes or raceways preferably disposed at an angle to the horizontal plane. The chutes 11 are arranged substantially parallel to each other above the frame 10 and each of these chutes is provided with a series of apertures 12, 13, 14, 15 and 16, the number of said apertures varying according to the variety of the sizes of the fruit to be graded. The first aperture 12 of said series is the smallest of them all while said apertures increase in diameter or size from the aperture 12 to the aperture 16. The end of the chute at which the aperture 12 is located is preferably the highest end, so as to assist the fruit in being conducted along said chute from the smaller aperture to the larger of the series. The upper ends of each of the chutes 11 communicate with a distributing casing 17 through openings 18 formed in the end wall 19 of said casing 17. To the wall 19 of said casing adjacent to each of said openings is secured a trap 20 which constitutes means for slightly retarding the passage of the fruit from the distributing casing 17 to the several chutes 11. The top of the distributing casing 17 is preferably open so as to permit the fruit which is to be graded to be deposited therein. To properly direct said fruit into the several chutes 11 from said distributer the bottom of said distributer is provided with grooves 21, 21 which aline respectively with the grooves which form the chutes 11. From the openings 18 of said casing, said grooves 21 gradually widen as they approach the upper end 22 of said casing 17. (See Figs. 1 and 6.) The casing 17 is pivotally attached to the frame 10 at its lower end by hinges 23 so as to permit the forward end 22 thereof to be raised or lowered to increase or diminish the tendency of the fruit in said casing to advance through the openings 18. The chutes 11 are each provided with a depression 24 arranged just below the openings 18 into which the fruit, as it passes through said opening, is adapted to drop, and by reason of the trap 20 which coöperates therewith, further gravitating movement of said fruit will be prevented.

The depression 24 and apertures 12, 13, 14, 15 and 16 are preferably spaced equal distances apart along each chute and means have been provided for advancing the fruit from the depression 24 step by step along said chute above said apertures until it reaches an aperture which is large enough in diameter to permit the same to pass or drop therethrough, said holes 12, 13, 14, 15 and 16 constituting gages whereby the fruit of different sizes may be grouped together in different piles or in separate receptacles. To accomplish the advancing of said fruit along the chutes 11, I have preferably provided a series of pushers 25 arranged beneath and slightly in advance of each of the apertures in said chutes and also in advance of the depression 24. The pushers 25 are mounted upon a suitable carrier frame 26 to which motion is imparted to cause the pushers 25 to move upwardly into contact with the fruit, provided there happens to be such in the aperture there-above and push the same along to the next aperture in the series. To permit the pushers 25 to pass upwardly into contact with said fruit each of the chutes 11 is provided with a slot 27, extending longitudinally thereof and communicating or connecting each of the apertures therein, and likewise extending through the depression 24. After the fruit has been pushed from one of said apertures to the next, the pushers 25 are caused to drop beneath the chutes 11, and returned to their normal positions in advance of their respective apertures as shown in Fig. 2, thereby imparting, as it were, a four part motion to said pushers.

The preferred means for advancing and retracting the carrier frame 26 preferably consists of a crank shaft 28 journaled to rotate in suitable bearings 10, motion being preferably imparted thereto by a crank handle 29 or any other suitable instrumentalities.

A link 30 connects the crank 31 of the shaft 28 with the frame 26 so that as motion is imparted to the shaft 28 by the crank handle 29 or by power if desired, said frame 26 will be reciprocated. In order to cause the frame 28 to move upwardly as it advances and downwardly as it is retracted, I have provided means, preferably consisting of studs 32, 32 secured to opposite sides of said frame adjacent to the forward and rear ends thereof. Secured to the frame 10 adjacent to each of the studs 32 are cam plates 33, each consisting of a horizontal portion 34 and an upwardly curved portion 35, said upwardly curved portion being at the lower end of said horizontal portion with respect to the direction of movement of the fruit along said chutes. A switch, 36 is arranged above each of the horizontal portions 34, said switches being pivoted at 37 at their rear ends which are substantially elevated above the forward ends of said switches and are engaged by the studs 32 as the frame 26 advances, causing said frame to move upwardly during the advance movement thereof.

The upper ends of the switches 36 terminate at distances from the curved portions 35 of said cam plates, providing gaps 38 which are wide enough to permit the studs 32 to pass downwardly along the curved portions 35 which permit a gradual lowering of said carrier frame during the return movement thereof. For convenience in assembling the several pushers, and in order to render the pushers 25 resilient, said pushers have preferably been constructed of resilient sheet metal bent substantially U-shaped and secured at the free ends thereof preferably by bolts 39 to cross-bars 40. The cross-bars are mounted between the side members 41, 41 of the carrier frame 26, which carrier frame is preferably formed rectangular. The cross-bars 40 are furthermore pivotally connected to said side bars while each of said pivoted bars is connected to the other bars of the set by a link 42 and the link is held in a predetermined position with respect to said frame by a pin 43. This permits said pushers to be simultaneously rocked if desired to substantially horizontal positions in order to facilitate access to the bolts wherewith they are secured to their respective cross-bars.

Extending transversely of the chutes 11 adjacent to the lower ends thereof, is a trough constructed of substantially soft material, preferably canvas or burlap. This trough is adapted to receive all fruit which happens to be too large to pass through any of the apertures or for any other reason escapes the same and conducts said fruit to a receptacle 45 arranged at the lower end of said trough. The apertures in one of the chutes 11 preferably correspond in diameter to the series of apertures in the next or all of the other chutes so that apertures of like size in the several chutes are arranged substantially in a line extending transversely of said chutes.

Beneath the several rows of like sized apertures is placed a trough similar to the trough 44 and of substantially the same material, that is to say, beneath the row of apertures 12 is arranged a trough 46 extending transversely of said chute, and adapted to catch all of the fruit which drops from any of the holes 12 in said row. Beneath the row of apertures 12, 13, 14, 15 and 16 are also provided troughs 47, 48, 49 and 50 respectively. The troughs 46, 47, 48, 49 and 50 are each inclined so as to conduct the fruit which drops thereinto to receptacles placed adjacent to the lower ends thereof.

In Fig. 8 is illustrated a modified form of means for operating the carrier frame to advance the fruit along the chutes. This form preferably consists of a pair of crank shafts 51 and 52 arranged adjacent to opposite ends of the carrier frame 53 and pivotally connected therewith. The crank shafts 51 and 52 are preferably connected by a chain 54 extending around sprockets 55 and 56 upon the shafts 51 and 52 respectively, said chain preventing a relative movement between said shafts. The shafts 51 and 52 are journaled to rotate on the frame 10'.

The operation of the apparatus hereinbefore specifically described is as follows: The fruit to be graded is deposited in the distributer casing 17 which is inclined at the proper angle. The grooves 21 at the bottom of said casing are so formed that the fruit will be guided and directed toward the openings 18 without any outside assistance. The first fruit to pass through said openings settles in the depression 24 and is held therein against further gravitating movement by the traps 20. The pushers 25 are then set into operation by rotating the crank shaft 28, causing said pushers to move upwardly through the slots 27 into contact with the fruit resting in the depression 24 and causing fruit therein to be pushed upwardly out of said depression and along the chute to the first row 12 of apertures in the series of chutes. If the fruit which is advanced as stated is smaller in diameter or substantially of the same diameter as the first of said apertures, it will drop therethrough into the trough 46 and owing to the inclination of said trough pass to the receptacle provided at the lower end thereof. If said fruit is larger in diameter than said aperture, it will remain in position thereabove and be held in such a position by partially settling into the same. The remaining fruit in the distributer 17 is permitted to advance by the removal of the fruit from the depression 24 until the rows of depressions 24 are again filled with fruit. Upon the next operation of the crank shaft 28, the fruit resting above the apertures 12 will be pushed along by the pusher there beneath over the next row of apertures 13 and if nearly equal or smaller in size to the apertures 13, said fruit will be dropped downwardly therethrough and be conducted by the trough 47 to another receptacle. If not of a sufficient size the fruit will rest above the aperture and be advanced by the next movement of the carrier frame and pushers and so on until the hole of the right size has been found, or if of an abnormally large size it will be conducted along the chute beyond the series of holes to the trough 44 and into the receptacle 45. From the time the fruit is deposited in the distributer to the time it is deposited in the several receptacles provided to receive the same there will be practically no necessity for handling the same. Furthermore, the pushers are made of resilient material and the troughs which catch the fruit from the apertures are made of soft material so that the chance of bruising the fruit as it is operated upon will be eliminated.

In order that free access may be had to the mechanism beneath the several chutes 11, said chutes have been mounted upon a frame 56' which is pivoted at 57 adjacent to the upper end thereof permitting said frame to be swung upwardly from the frame 10 of said apparatus.

Having thus specifically described my invention, what I claim and desire by Letters Patent to secure is:

1. A fruit grading apparatus having, in combination, a chute provided with a plurality of apertures arranged longitudinally thereof, a series of pushers arranged beneath said chute adapted to be moved to advance fruit from aperture to aperture, a carrier frame for said pushers, means for reciprocating said carrier frame longitudinally of said chute and means for imparting an upward and a downward movement to said frame during the advancing and retracting movements thereof respectively, said means including projecting members upon opposite sides of said frame adjacent opposite ends thereof, stationary cam plates adapted to coöperate with said projecting members and switches arranged adjacent to said cam plates adapted to guide said projecting members upwardly during the movement of said frame in one direction.

2. A fruit grading apparatus having, in combination, a chute provided with a plurality of apertures arranged longitudinally thereof, a series of pushers arranged beneath said chute, adapted to be moved to advance fruit from aperture to aperture, a carrier frame for said pushers, means for reciprocating said carrier frame longitudinally of said chute, cam plates arranged at opposite sides of said frame and adjacent to opposite ends thereof, switches pivoted adjacent to said cam plates, and means coöperating with said cam plates and said switches during the reciprocating movements of said frame adapted to impart an upward and a downward movement to said frame, whereby said pushers may be moved to engage the fruit in said chutes and to be disengaged therefrom.

3. A fruit grading apparatus having, in combination, a chute provided with a plurality of graduated apertures arranged longitudinally thereof, a carrier frame, means constructed and arranged to reciprocate said carrier frame longitudinally of said chute and to move said carrier frame upwardly and downwardly with respect thereto, during said reciprocations, a series of pushers corresponding in number to said apertures and pivotally mounted upon said carrier frame, and means for locking said pushers to said carrier frame in their normal operative positions.

In testimony whereof I have hereunto set my hand in presence of two subscribing witnesses.

WALTER G. PARKER.

Witnesses:
CHARLES S. GOODING,
SYDNEY E. TAFT.